No. 721,288. PATENTED FEB. 24, 1903.
P. DANCKWARDT.
APPARATUS FOR RECEIVING AND HANDLING MOLTEN MATERIALS.
APPLICATION FILED JULY 31, 1902.
NO MODEL.
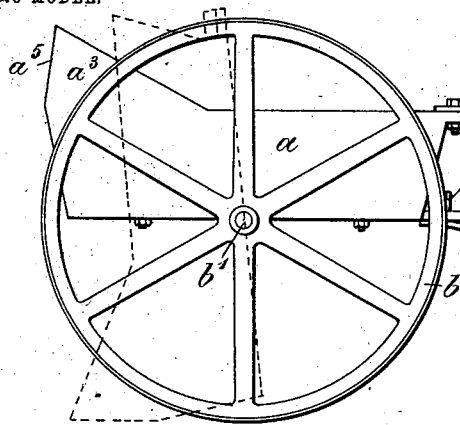
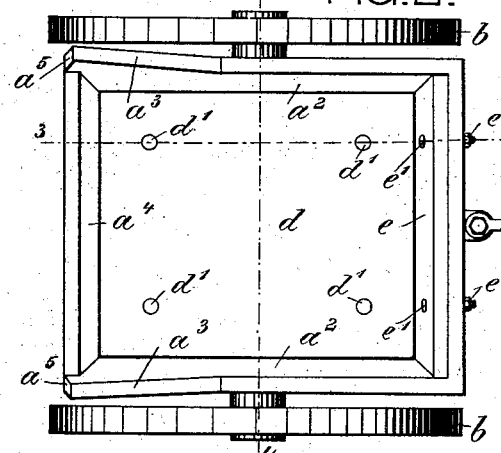
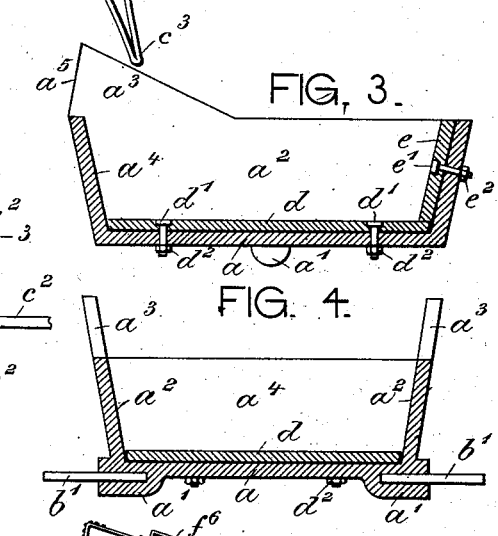
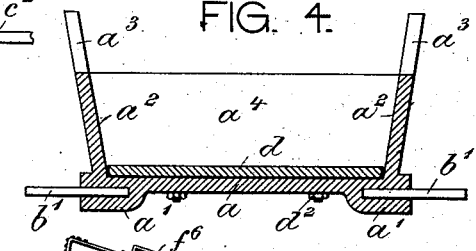
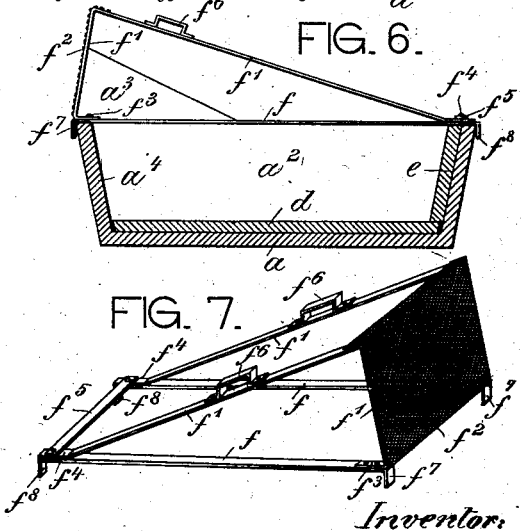
Witnesses:
Inventor:
Paul Danckwardt
by his attorneys

UNITED STATES PATENT OFFICE.

PAUL DANCKWARDT, OF DEADWOOD, SOUTH DAKOTA.

APPARATUS FOR RECEIVING AND HANDLING MOLTEN MATERIALS.

SPECIFICATION forming part of Letters Patent No. 721,288, dated February 24, 1903.

Application filed July 31, 1902. Serial No. 117,770. (No model.)

*To all whom it may concern:*

Be it known that I, PAUL DANCKWARDT, a citizen of Germany, residing at Deadwood, Lawrence county, South Dakota, have invented certain new and useful Improvements in Apparatus for Receiving and Handling Molten Materials, of which the following is a specification.

This invention relates to an apparatus for receiving metals, matte, litharge, and other molten materials when tapped from the furnace and casting them into ingots. By my invention the manipulation of the molten material is simplified, and the life of the apparatus is extended.

In the accompanying drawings, Figure 1 is a side elevation of my improved apparatus; Fig. 2, a plan; Fig. 3, a section on line 3 3, Fig. 2; Fig. 4, a section on line 4 4, Fig. 2; Fig. 5, a rear view of the apparatus, showing the cover; Fig. 6, a section similar to Fig. 3, showing the cover; and Fig. 7, a perspective view of the cover.

The letter $a$ represents a shallow iron pot cast in one piece and having a flat bottom and inclined sides and ends, that gradually taper from top to bottom. The pot is mounted upon wheels $b$, turning on axles $b'$, cast in studs $a'$, Fig. 4. The axles are placed slightly in the rear of the pot center, so that the pot has a slight overweight at the front. A handle $c$, bolted at $c'$, is provided with a brace $c^2$ and a foot $c^3$, the latter supporting the pot in its normal horizontal position. The sides $a^2$ of the pot are extended upwardly at the rear to form angular projections $a^3$, that extend above the upper edge of the back $a^4$. In this way there is formed between the projections $a^3$ and above the back $a^4$ an opening for the discharge of the cake or ingot when the pot is tilted backward, (dotted lines, Fig. 1.) Upon being thus tilted the pot is supported upon the wheels $b$ and upon the rear edge $a^5$ of projections $a^3$, so as to slightly overhang backward. Owing to the sudden jar resulting from the tilting of the pot the solidified cake will be thrown out over the back $a^4$ and between the sides $a^2$, so that the pot is rapidly unloaded.

In order to insure a uniform expansion of the shallow pot while filled with matte, I arrange within the pot a false bottom $d$ and a false front $e$, as these parts are most exposed to the action of the entering matte. The plates $d$ and $e$ are removably secured to the bottom and front by countersunk bolts $d'$ $e'$ and nuts $d^2$ $e^2$, so that they may be readily replaced when worn. As the entering matte first strikes against the bottom and front of the pot these parts, if unprotected, would expand more than the rest of the pot, and cracking of the latter would be unavoidable. By attaching the plates $d$ and $e$ in the manner described the pot is allowed to freely and uniformly expand.

In order to protect the workmen from burns, I employ a cover composed of two straps $f$, having downwardly-bent ends $f^7$ and $f^8$. These straps are connected by a cross-bar $f^5$ and are riveted at $f^3$ and $f^4$ to two angular bands $f'$, having handles $f^6$. The inclined rear sections of the bands $f'$ carry a screen $f^2$. The cover fits between the projections $a^3$ of pot $a$ and is held in position by the flanges $f^7$ and $f^8$, which embrace the front and rear sides of the pot.

The pot is mudded in the usual manner after each tap and will thus not allow any molten metal to run out of the bolt-holes.

It will be seen that by my invention the handling of the molten metal, litharge, matte, &c., is greatly simplified, that the life of the apparatus is prolonged, and that the molten material may be readily removed from the furnace and cast into ingots.

What I claim is—

1. An apparatus for handling molten materials, composed of a wheel-mounted pot having a back, and sides that are projected above the back, substantially as specified.

2. An apparatus for handling molten materials, composed of a wheel-mounted pot having a back, and sides having rear angular projections extending above the back and adapted to support the pot in its upright position, substantially as specified.

3. An apparatus for handling molten materials, composed of a wheel-mounted pot having a flat bottom and an inclined straight front, a false bottom, a false front, and means for removably securing said false bottom and false front to the pot, substantially as specified.

4. In an apparatus for handling molten materials, a wheel-mounted pot, combined with a cover having a pair of straps, a pair of angular bands connected thereto, and a screen secured to said bands, substantially as specified.

5. An apparatus for handling molten materials, composed of a wheel-mounted pot having sides that project above the pot back, a removable false bottom, and a removable false front, combined with a cover having a pair of straps, a pair of angular bands connected thereto, and a screen secured to said bands, substantially as specified.

Signed by me at Deadwood, South Dakota, this 26th day of July, 1902.

PAUL DANCKWARDT.

Witnesses:
R. N. OGDEN,
GEO. W. INGLIS.